United States Patent [19]
Bullard

[11] Patent Number: 6,019,345
[45] Date of Patent: Feb. 1, 2000

[54] CHILD PROOF HANDLE FOR A FAUCET

[76] Inventor: Fred Bullard, 15770 Rotherford, Detroit, Mich. 48227

[21] Appl. No.: 09/220,659

[22] Filed: Dec. 24, 1998

[51] Int. Cl.[7] .................................................. F16K 35/02
[52] U.S. Cl. ................................ 251/96; 74/25; 74/548; 74/554; 192/95; 251/229; 403/1
[58] Field of Search .............................. 251/96, 95, 229; 74/25, 111, 548, 552, 553, 554, 575; 192/70.11, 95; 403/1; 16/432, 433, 441

[56] References Cited

U.S. PATENT DOCUMENTS

| | | | |
|---|---|---|---|
| 604,617 | 5/1898 | Hoxie | 251/96 |
| 2,829,538 | 4/1958 | Mueller | 251/96 |
| 3,001,551 | 9/1961 | Wyser | 251/96 |
| 3,210,040 | 10/1965 | Thurlow | 251/96 |
| 4,549,716 | 10/1985 | Warren | 251/96 |
| 5,217,201 | 6/1993 | Self | 251/90 |
| 5,346,065 | 9/1994 | Tauati | 251/96 |
| 5,449,144 | 9/1995 | Kowalics | 251/99 |
| 5,513,831 | 5/1996 | Seward | 251/96 |
| 5,551,124 | 9/1996 | Zerinque | 251/96 |
| 5,671,904 | 9/1997 | Minutillo | 251/96 |
| 5,741,003 | 4/1998 | Seigen, Jr. | 251/96 |

*Primary Examiner*—George L. Walton
*Attorney, Agent, or Firm*—Kenneth L Tolar

[57] ABSTRACT

A child proof handle for a bathtub faucet includes a substantially cylindrical inner handle member having a centrally located bore for receiving the faucet valve stem and a pair of diametrically opposed passageways. The device also includes an outer handle member having an open end in communication with a hollow portion and a substantially centrally disposed bore. Received within the bores on the inner and outer handle members is an elongated bolt that secures the handle members to the valve stem. A spring is disposed between the inner and outer handle members for biasing the outer handle member away from the inner handle member. The outer handle member further includes a pair of diametrically opposed pins received within the hollow portion spaced and dimensioned to be received within the passageways on the inner handle member. Accordingly, the outer handle member may be moved towards the inner handle member and rotated until the pins seat within the passageways such that the outer handle member, the inner handle member and the valve stem cooperatively rotate.

2 Claims, 1 Drawing Sheet

CHILD PROOF HANDLE FOR A FAUCET

BACKGROUND OF THE INVENTION

The present invention relates to a child proof handle for a bathtub faucet that minimizes the risk of a child being scalded while bathing.

DESCRIPTION OF THE PRIOR ART

Bathing an infant or toddler in a bathtub can be dangerous. Most conventional bathtub faucets may be adjusted by simply rotating a knob in a predetermined direction. Accordingly, a child standing near the faucet can easily increase the hot water flow or decrease the cold water flow resulting in scalding hot water being delivered through the faucet. In some instances, the hot water may have a sufficient temperature to result in severe burns. The present invention relates to a child proof faucet handle for a bathtub that is difficult, if not impossible, for a child to operate.

Various safety valves for faucets exist in the prior art. For example, U.S. Pat. No. 5,671,904 issued to Minutillo relates to a valve safety handle having a female spline sized to engage a valve stem male spline. The male spline includes a valve stem key which must be received within a recessed keyway on the handle member in order for the handle member to be translated relative to the valve stem. The handle member is connected to the valve stem with a spring biasing means which normally biases the handle member away from the valve stem. Accordingly, in order to operate the valve, the handle must be rotated until the stem key is aligned with the keyway recess. Then, the handle is translated inwardly toward the valve stem whereby the stem is received within the female spline allowing the handle to rotate with the stem.

U.S. Pat. No. 5,551,124 issued to Zeringue relates to a faucet safety handle including a knob having an aperture therethrough and a clutch mechanism disposed between the knob and the valve stem such that the knob rotates freely with respect to the valve stem when the knob is in a first position. The valve stem rotates in conjunction with the knob when the knob is in a second position.

U.S. Pat. No. 5,513,831 issued to Seward relates to a safety control knob for a bathtub faucet stem including a control knob rotatably channeled on the valve stem and movable thereon between an operative and inoperative position. In the inoperative position, the control knob rotates freely around the valve stem without turning the valve stem. In an operative position, the control knob engages a collar or other member keyed to the valve stem.

U.S. Pat. No. 5,449,144 issued to Kowalics relates to a faucet valve with safety handle including a valve body having a chamber with a valve element movable between first and second positions for controlling flow between the inlet and outlet.

U.S. Pat. No. 5,346,065 issued to Tauati relates to a push control faucet handle including a housing mounted to a sink. A water control valve is connected to the bottom of the housing and includes a first pipeline connected to a water supply line and a second pipeline connected to the spout in the sink.

U.S. Pat. No. 5,217,201 issued to Self relates to a central support tube that receives a valve stem having a housing extending upwardly from a rear distal end thereof.

Although various safety valve handles for bathtub faucets exist in the prior art, none relate to an easy to use and inexpensive to manufacture device according to the present invention.

SUMMARY OF THE INVENTION

The present invention relates to a child proof safety valve assembly for a bathtub faucet. The device comprises an inner cylinder member having a centrally located bore for receiving a faucet valve stem and a pair of diametrically opposed passageways. The valve assembly also includes an outer cylinder likewise having a centrally located bore axially aligned with the inner cylinder member bore both of which receive an elongated threaded bolt for coupling the cylinder members to the valve stem. The outer cylinder member includes a hollow portion for surrounding and receiving the inner cylinder when thrust thereagainst. Received within the hollow portion of the outer cylinder member are a pair of diametrically opposed pin members spaced and dimensioned to be inserted within the passageways on the inner cylinder member. The inner and outer cylinder members have an interposed spring member for normally biasing the outer cylinder member to a disengaged position relative to the inner cylinder member. To actuate or rotate the valve stem, the outer cylinder is pressed towards the inner cylinder and rotated until the pins are seated within their respective passageways. At such time, rotation of the outer cylinder will result in rotation of the valve stem. It is therefore an object of the present invention to provide a child proof valve handle that is easy to use and inexpensive to manufacture.

It is yet another object of the present invention to provide a child proof handle for a valve stem that is normally inoperative by a child or infant.

Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
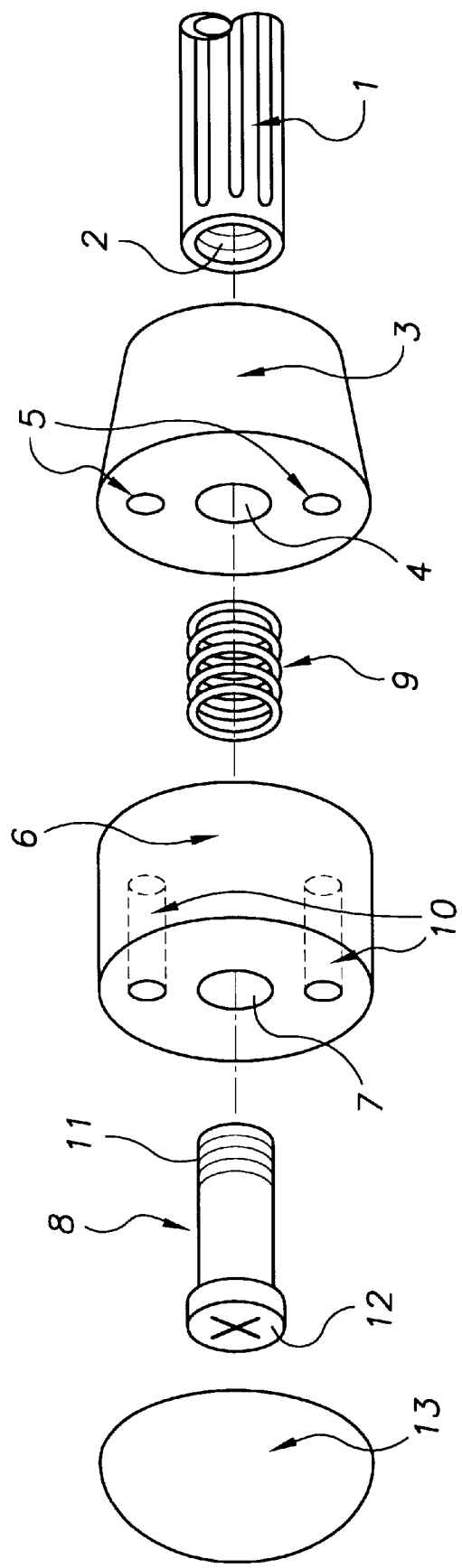
FIG. 1 is an exploded, perspective view of the inventive device.

Referring now to FIG. 1, the present invention relates to a child proof handle for a bathtub faucet. A conventional bathtub faucet includes hot and cold water valves each of which are moved between opened and closed positions by rotating a valve stem 1. The valve stem typically includes an internally threaded portion 2 at a distal end for threadedly receiving a handle member.

The present invention relates to a child proof handle for mounting to the conventional faucet valve stem as described above. The device comprises a substantially cylindrical inner handle member 3 having a centrally located bore 4 therethrough for receiving the valve stem. The centrally located bore preferably includes ridges, cleats or similar means (not pictured) for frictionally engaging or adhering to the exterior of the valve stem such that rotation of the inner handle member will result in rotation of the valve stem. The inner handle member further includes a pair of diametrically opposed passageways 5.

The device also includes a substantially cylindrical outer handle member 6 having a front end and an open rear end in communication with a hollow portion for receiving a segment of the inner handle member when thrust thereagainst. Received within the hollow portion are a pair of diametrically opposed pins 10, spaced and dimensioned to be received within the passageways on the inner handle member. The outer handle member further includes a substantially centrally located bore 7 that is axially aligned with the bore on the inner handle member. The axially aligned bores receive an elongated bolt 8 having an externally threaded portion 11 at a first end and a head 12 at an opposing end. The threaded portion of the bolt threadedly engages the internally threaded portion of the valve stem to secure the inner and outer handle members thereto. The bolt has sufficient length to allow the outer handle member to be translated along the bolt a predetermined distance.

The inner and outer handle members include an interposed spring 9 that normally biases the outer handle member away from the inner handle member. Accordingly, in a normal position, the inner and outer handle members are separated whereby the outer handle member rotates freely relative to the inner handle member. Removably mounted to the front end of the outer handle member is a decorative cap 13, having a design element thereon, that conceals the elongated bolt head and provides an aesthetically enhanced appearance to the child proof handle.

To use the above described device, a user thrusts the outer handle member against the inner handle member and is rotated until the pins seat within their respective passageways whereby the outer handle member, the inner handle member and valve stem cooperatively rotate. The child proof handle member according to the present invention is preferably placed on a bathtub or sink hot water faucet or both the hot and cold water valve stems.

Although the above described assembly has been described and depicted as having a pair of pins selectively receivable within a pair of passageways, any number of pins and passageways may be provided. The inner and outer handle members according to the present invention are preferably constructed with plastic while the elongated bolt and spring are fabricated with metal or a similar equivalent. However, as will be readily apparent to those skilled in the art, the size, shape and materials of construction may be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A child proof handle for mounting to and selectively rotating a faucet valve stem comprising:

an inner handle member fixedly coupled to said valve stem, said inner handle member having an upper surface and a lower surface and a pair of elongated passageways, said inner handle member further including a bore disposed between said passageways and extending from the upper surface to the lower surface of said inner handle member, said bore including a plurality of ridges for frictionally engage a faucet valve stem whereby rotation of said inner handle member results in rotation of said stem;

an outer handle including a lower open end in communication with a cavity, said cavity including a pair of elongated, substantially tubular pins, said pins spaced and dimensioned to be received within said passageways on said inner handle member, said outer handle member including a bore disposed between said pins and extending from the upper surface to the lower surface, said bore axially aligned with said bore on said inner handle member;

a spring disposed between said inner handle member and said outer handle member and extending from the upper surface of said inner handle member into the cavity of said outer handle member for biasing said outer handle member away from said inner handle member, said spring axially aligned with said bores on said inner and outer handle members;

a bolt received within said aligned bores and said spring, said bolt having a lower end coupled with said valve stem and an upper end having a head thereon that rests on the upper end of said outer handle member whereby said outer handle member is rotated to a select position to axially align said pins with said passageways and said outer handle member is thrust towards said inner handle member until said pins are received within said passageways allowing said outer handle member, said inner handle member and said valve stem to cooperatively rotate.

2. A device according to claim 1 further comprising a decorative cap member removably attached to the upper end of said outer handle member for concealing said bolt head.

* * * * *